United States Patent
Chang

(10) Patent No.: US 11,415,748 B2
(45) Date of Patent: Aug. 16, 2022

(54) FIBRE OPTIC CABLE STRIPPER WITH THREADED BLADE MOVING SYSTEM

(71) Applicant: EZCONN CORPORATION, New Taipei (TW)

(72) Inventor: Pao-chen Chang, New Taipei (TW)

(73) Assignee: EZconn Corporation, New Taipei (TW)

( * ) Notice: Subject to any disclaimer, the term of this patent is extended or adjusted under 35 U.S.C. 154(b) by 29 days.

(21) Appl. No.: 17/211,836

(22) Filed: Mar. 25, 2021

(65) Prior Publication Data

US 2021/0364699 A1 Nov. 25, 2021

(30) Foreign Application Priority Data

May 22, 2020 (TW) .................................. 109206335

(51) Int. Cl.
*G02B 6/245* (2006.01)
*H02G 1/12* (2006.01)
*G02B 6/44* (2006.01)

(52) U.S. Cl.
CPC ........... *G02B 6/245* (2013.01); *G02B 6/4497* (2013.01); *H02G 1/1204* (2013.01)

(58) Field of Classification Search
CPC .... G02B 6/245; G02B 6/4497; G02B 6/4471; H02G 1/1204
See application file for complete search history.

(56) References Cited

U.S. PATENT DOCUMENTS

| | | | | |
|---|---|---|---|---|
| 3,665,603 A * | 5/1972 | Bilbrey | ............... | H02G 1/1231 30/90.7 |
| 3,722,092 A * | 3/1973 | Lukas | ................ | H02G 1/1231 30/90.9 |
| 3,826,001 A * | 7/1974 | Bilbrey | ............... | H02G 1/1226 30/142 |
| 4,489,490 A * | 12/1984 | Michaels | ............ | H02G 1/1229 30/90.1 |
| 6,079,297 A * | 6/2000 | Chandler | ............... | G02B 6/245 81/9.51 |
| 6,308,417 B1 * | 10/2001 | Ducret | ................ | H02G 1/1231 30/90.9 |
| 6,598,497 B1 * | 7/2003 | Mizushima | ........... | G02B 6/245 81/9.41 |
| 6,681,600 B1 * | 1/2004 | Mitchell | ............... | G02B 6/245 156/345.23 |

(Continued)

*Primary Examiner* — Andrew Jordan

(57) ABSTRACT

A fibre optic cable stripper, comprising an alignment and fixing element, a rotational adjuster, and a lateral stripping and removing element is provided. The alignment and fixing element, aligning and fixing the fibre optic cable, comprises an alignment and threaded sleeve portion and a fixing portion. The rotational adjuster, sleeved on the alignment and threaded sleeve portion, rotatably moves back and forth thereon. The lateral stripping and removing element, cutting and stripping and rotating the rotational adjuster, comprises an enabling gap portion and a lateral sleeve portion. The lateral sleeve portion is mounted to the rotational adjuster and the enabling gap portion strips at least two gaps through to an end of the fibre optic cable having a preset depth via rotatable movement of the rotational adjuster. The preset depth is different depths defining different diameter sizes of the fibre optic cable.

20 Claims, 9 Drawing Sheets

(56) References Cited

U.S. PATENT DOCUMENTS

| | | | | |
|---|---|---|---|---|
| 6,754,416 B1* | 6/2004 | Mitchell | ............ | G02B 6/02123 |
| | | | | 385/136 |
| D505,056 S * | 5/2005 | Tarpill | ............. | D8/51 |
| 6,973,252 B2* | 12/2005 | Doss | .................... | G02B 6/3806 |
| | | | | 385/136 |
| 11,105,996 B2* | 8/2021 | Allen | ................... | G02B 6/4477 |
| 2003/0188432 A1* | 10/2003 | Temple | ................ | H02G 1/1229 |
| | | | | 30/90.6 |
| 2005/0044715 A1* | 3/2005 | Shutts | .................. | G02B 6/4497 |
| | | | | 30/91.2 |
| 2005/0058422 A1* | 3/2005 | Doss | ................... | G02B 6/3846 |
| | | | | 385/137 |
| 2009/0013535 A1* | 1/2009 | Derancourt | .......... | H02G 1/1231 |
| | | | | 30/90.6 |
| 2013/0042483 A1* | 2/2013 | Ducret | ................ | H02G 1/1229 |
| | | | | 30/90.7 |
| 2020/0064579 A1* | 2/2020 | Allen | ................ | G02B 6/4477 |
| 2020/0192029 A1* | 6/2020 | Zagula | ................ | G02B 6/4497 |
| 2020/0373745 A1* | 11/2020 | Galindo Gonzalez | ....................... | |
| | | | | H02G 1/1239 |
| 2021/0271033 A1* | 9/2021 | Cao | ....................... | G02B 6/3889 |
| 2021/0341674 A1* | 11/2021 | Narum | ................... | G02B 6/245 |
| 2021/0364699 A1* | 11/2021 | Chang | .................... | G02B 6/245 |
| 2022/0026644 A1* | 1/2022 | Chang | ................ | G02B 6/38875 |

* cited by examiner

FIBRE OPTIC CABLE STRIPPER WITH THREADED BLADE MOVING SYSTEM

RELATED APPLICATIONS

The application claims the benefit of priority to Taiwan application no. 109206335, filed on May 22, 2020, of which is incorporated herein by reference in its entirety.

TECHNICAL FIELD

Example embodiments relate generally to the field of optical communications and, more particularly, to fibre optic cable termination tools.

BACKGROUND

Driven by the ever-growing computing demands of cloud users, generation of massive amounts of data by edge computing devices such as AI-enabled IoT devices, and roll-out of 5G networks, the architectures of hyperscale, colocation and on-premise data centers are rapidly evolving. Meanwhile, new data centers closer to end-users or devices are being built as the demand for services that rely on edge data centers has increased. With a growing demand for higher performance and speed, widespread use of optical fibres in communication systems has increased. In optical communication systems, light is used to send data to a remote end via a core of an optical fibre, encapsulated within a fibre optic cable, in the form of pulses of light, instead of electrical current.

Fibre optic cables are designed and insulated based upon various indoor and outdoor applications and each typically comprise at least a core surrounded by a cladding, trapping light within the core, and a buffer surrounding the cladding and core, protecting the optical fibre from moisture and physical damage. The size of the core is dependent upon the type of fibre optic cable. Generally, a single mode optical fibre (SMF) may have a coating diameter of 125 µm±10 µm, and outer cladding diameter of 200±15 µm and a core diameter of about 5 µm to 10 µm, while a multimode optical fibre (MMF) may have a coating diameter of 125 µm±1 µm, and outer cladding diameter of 200±15 µm and a core diameter of about 10× times that of the SMF core diameter.

With new data centers being built and existing data centers being upgraded, along with technological advancements in the telecom sector increasing the deployment of broadband network architectures such as Fibre to the Home (FTTH) and Fibre to the Building (FTTB), technicians are increasingly being required to terminate fibre optic cables not just when deployed, but, several times during deployment. Fibre optic cable termination either mates two optical fibres to create a temporary joint and/or connects the optical fibre to a piece of network gear or with splices which create a permanent joint between the two optical fibres. One of the first steps in fibre optic cable termination is the stripping of the fibre optic cable.

Fibre optical stripping allows for the removal of the protective coating encapsulating the outer cladding and core of the fibre optic cable. Special stripping and preparation instruments or machines that use thermal, chemicals, plasma or blades or stripping mechanical tools are typically used for stripping of the fibre optic cables. Generally, special stripping and preparation instruments or machines cost more, require power, and are larger and less portable to use than stripping mechanical tools.

Stripping mechanical tools, such as, handheld mechanical optical fibre strippers, cut into a protective coating of an optical fibre cable with at least a cut blade. Generally, a compression force by a squeezing motion from a technician's hand is required for at least the initial cut to a preset factory determined depth, such as, via a specific hole diameter, for removal or pulling of the protective coating. As the amount of preset factory determined diameter sizes increase, as an example, different diameter sizes for an optical fibre jacket, buffer, and coating, the amount of separate notches required for the handheld mechanical optical fibre stripper increases, increasing its size and decreasing portability and convenience. For handheld mechanical optical fibre strippers that offer interchangeable different sized blades, additional parts and manual blade adjustments are required by technicians, decreasing convenience due to lost parts and increasing operational time for manual adjustments. For both types of handheld mechanical tools, the conditions are exacerbated as the amount of different suppliers and types of SMF and MFF optical fibre cables requiring different diameter sizes, increases. Both types of handheld mechanical tools typically require the technician to manually pull the protective coating from the optical fibre. With a critical aspect of optical fibre implementation being the joining of fibres with minimal signal loss and reflections as well as providing mechanically stable connections. If the blade of a handheld mechanical optical fibre stripper contacts a bare fibre, a damaging nick or scratch in the optical fibre cladding may significantly reduce reliability of the optical fibre cable. Increased manual manipulation of handheld mechanical optical fibre strippers by a technician increases the possibility of fibres being nicked, scratched, cracked or broken during, as an example, the optical fibre cable jacket and/or buffer removal and/or optical fibre stripping. Furthermore, both types of handheld mechanical tools require a coating or layer of the optical fibre cable to be directly exposed to the outer environment after manual pulling of the cut coating, increasing the possibility for contamination from dust or dirt. Contamination from dust or dirt during the termination or splicing process decreases the possibility that the joining of fibres would be with minimal signal loss and reflections as well as mechanically stable connections.

SUMMARY

Fibre optic cable strippers for stripping fibre optic cables and fibre optic cable system are provided.

In an embodiment, a fibre optic cable stripper, configured for stripping a fibre optic cable, comprising an alignment and fixing element, a rotational adjuster, and a lateral stripping and removing element is provided. The alignment and fixing element is configured for receiving, aligning and fixing the fibre optic cable. The alignment and fixing element comprises an alignment and threaded sleeve portion and a fixing portion attached thereto. The alignment and fixing element define an alignment and fixing core having a distal core central axis. The alignment and threaded sleeve portion comprises a distal threaded end abutting the fixing portion, a proximal threaded end opposite the distal threaded end surrounding a proximal alignment and threaded sleeve opening of the alignment and fixing core, and a main threaded portion between the proximal and distal threaded ends. The fixing portion is configured to fix and release the fibre optic cable within the fibre optic cable stripper. The rotational adjuster is sleeved on the alignment and threaded sleeve portion and configured to rotatably move laterally from the distal to the proximal threaded ends and back. The rotational adjuster has a lateral adjuster central axis. The lateral stripping and removing element, configured to cut and strip the fibre optic cable, comprises an enabling gap portion and a lateral sleeve portion attached thereto. The lateral sleeve portion is mounted to the rotational adjuster, and configured to move from the distal to the proximal threaded ends and back via the rotational adjuster. The enabling gap portion strips at least two gaps through to an end of the fibre optic cable having a preset depth via rotatable movement of the rotational adjuster. The lateral stripping and removing element define a stripping and removing core having a proximal core central axis.

The fibre optic cable has a fibre optic cable central axis, and the distal core central axis, lateral adjuster central axis, proximal core central axis, and fibre optic cable central axis are on a same lateral axis. The fibre optic cable is mounted through the alignment and fixing core and stripping and removing core for stripping thereof. Following the receiving and fixing of the fibre optic cable, the enabling gap portion strips at least two gaps through to an end of the fibre optic cable having a preset depth via rotatable movement of the rotational adjuster from the distal threaded end toward the proximal threaded end.

Thus, the fibres of the fibre optic cable are enclosed within the alignment and fixing element and lateral stripping and removing element during rotatable movement of the rotational adjuster from the distal threaded end toward the proximal threaded end, and not directly exposed to the outer environment. Accordingly, the possibility for contamination from dust or dirt during termination or splicing processes decreases, increasing the possibility that the joining of fibres thereafter, will be with minimal signal loss and reflections as well as mechanically stable connections.

In some embodiments, the fixing portion comprises a gripping portion and a fixing fastener. The gripping portion surrounds a distal alignment and threaded sleeve opening opposite the proximal alignment and threaded sleeve opening and is configured to grip the fibre optic cable. The fixing fastener is mounted through the fixing portion to the gripping portion and is configured to move the gripping portion to and from the distal core central axis, fixing and releasing the fibre optic cable from the fibre optic cable stripper.

In some embodiments, the fixing fastener comprises a first fixing fastener having a first threaded rod and a second fixing fastener having a second threaded rod, wherein the second fixing fastener is opposite to the first fixing fastener. The fixing portion further comprises a first threaded receiving hole receiving the first threaded rod and a second threaded receiving hole receiving the second threaded rod. The gripping portion moves to and from the distal core central axis, fixing and releasing the fibre optic cable from the fibre optic cable stripper via movement of the first and second threaded rods through the first and second threaded receiving holes, respectively.

In some embodiments, the rotational adjuster comprises at least an adjuster handle and is configured for gripping and rotating the rotational adjuster when rotatably moving the rotational adjuster from the distal to the proximal threaded ends and back. In some embodiments, the rotational adjuster comprises four adjuster handles, evenly spaced annularly therearound and configured for gripping and rotating the rotational adjuster when rotatably moving the rotational adjuster from the distal to the proximal threaded ends and back.

In some embodiments, the lateral stripping and removing element further comprises a guide trough on an inner side facing the proximal core central axis, and the alignment and threaded sleeve portion comprises a guide rail on an outer side opposite the distal core central axis corresponding to the guide trough. When the lateral stripping and removing element moves from the distal to the proximal threaded ends and back via the rotational adjuster, the lateral stripping and removing element laterally moves without rotating.

In some embodiments, the enabling gap portion comprises a first enabling gap blade and a second enabling gap blade and a first enabling gap control setting lever and a second enabling gap control setting lever. The first and second enabling gap blades are protrudable through the stripping and removing core, and configured to cut and strip the fibre optic cable having a preset depth. The first and second enabling gap control setting levers are mounted through the enabling gap portion to the first and second enabling gap blades, respectively, and configured to move the first and second enabling gap blades to the preset depth toward the proximal core central axis and back, and cut and strip the fibre optic cable, forming the at least two gaps via the rotational adjuster moving the lateral stripping and removing element mounted thereto from the distal to the proximal threaded end. The first and second enabling gap blades and first and second enabling gap control setting levers are disposed on opposing ends of the enabling gap portion. In some embodiments, each of the first and second enabling gap blades comprises a proximal edge and an angled edge. The proximal edge is perpendicular with the proximal core central axis and configured to precisely cut vertically straight into the fibre optic cable having the preset depth. The angled edge is opposite the proximal edge, and angled toward a proximal lateral stripping and removing element opening of the lateral stripping and removing element. The angled edge is configured to precisely cut laterally straight through the fibre optic cable having the preset depth and laterally strip the fibre optic cable to form the at least two gaps via the rotational adjuster moving the lateral stripping and removing element mounted thereto from the distal to the proximal threaded end.

In some embodiments, the enabling gap portion further comprises a third enabling gap blade and a fourth enabling gap blade and a third enabling gap control setting lever and a fourth enabling gap control setting lever. The third and fourth enabling gap blades, protrudable through the stripping and removing core, are configured to cut and strip the fibre optic cable having a preset depth. The third and fourth enabling gap control setting levers mounted through the enabling gap portion to the third and fourth enabling gap blades, respectively, are configured to move the third and fourth enabling gap blades to the preset depth toward the proximal core central axis and back, and cut and strip the fibre optic cable, forming four gaps via the rotational adjuster moving the lateral stripping and removing element mounted thereto from the distal to the proximal threaded end. The first, second, third and fourth enabling gap blades and first, second, third and fourth enabling gap control setting levers are evenly spaced annularly around the enabling gap portion. In some embodiments, each of the first, second, third, and fourth enabling gap blades comprise a proximal edge and an angled edge. The proximal edge is perpendicular with the proximal core central axis and configured to precisely cut vertically straight into the fibre optic cable having the preset depth. The angled edge is opposite the proximal edge and angled toward a proximal lateral stripping and removing element opening of the lateral stripping and removing element. The angled edge is configured to precisely cut vertically straight through the fibre optic cable having the preset depth and laterally strip the fibre optic cable to form the at least two gaps via the rotational adjuster moving the lateral stripping and removing element mounted thereto from the distal to the proximal threaded end.

Thus, a compression force by a squeezing motion from a user's hand is not required to cut and strip the fibre optic cable. The fibre optic cable is precisely cut laterally straight therethrough to a preset depth, not by a hand of a user performing a squeezing motion, but, mechanically, via the adjustable enabling gap control setting lever, setting a depth of the enabling gap blade. Furthermore, the fibre optic cable is stripped to the proximal lateral stripping and removing element opening, not by a hand of a user performing a pulling or peeling motion, but, mechanically, via the lateral sleeve portion being attached to the enabling gap portion on one end and mounted to the rotational adjuster on the other opposing end, whereby rotational movement of the rotational adjuster, laterally moves the enabling gap portion to the proximal lateral stripping and removing element opening without rotating. Accordingly, as direct manual manipulation by operators is replaced with the mechanical elements of the fibre optic cable stripper of the embodiments being set prior to operation, the possibility of fibres being nicked, scratched, cracked or broken during, as an example, the optical fibre cable jacket and/or buffer removal and/or optical fibre stripping, is decreased, thus, increasing the possibility for mechanically stable connections and joining of fibres with minimal signal loss and reflections, following the stripping of the fibre optic cable.

In some embodiments, the preset depth is different depths defining different diameter sizes of the fibre optic cable centered on the fibre optic cable axis.

Thus, a separate dedicated notch for each preset factory determined diameter size, as an example, a different diameter size for an optical fibre jacket, buffer, and coating, respectively, is not required of the fibre optic cable stripper of the embodiments. The adjustable enabling gap control setting lever sets the preset depth of the enabling gap blade. Having multiple separate notches is not required, and for handheld mechanical optical fibre strippers that offer interchangeable different sized blades, additional parts and manual blade adjustments are not required. Accordingly, the size, portability, convenience, additional blade size parts, and additional operational time for manual adjustments of the fibre optic cable of the embodiments is not influenced and exacerbated as the amount of different suppliers and types of SMF and MFF optical fibre cables requiring different diameter sizes, increases.

BRIEF DESCRIPTION OF THE DRAWINGS

Unless specified otherwise, the accompanying drawings illustrate aspects of the innovative subject matter described herein. Referring to the drawings, wherein like reference numerals indicate similar parts throughout the several views, several examples of fibre optic cable stripper' incorporating aspects of the presently disclosed principles are illustrated by way of example, and not by way of limitation.

DETAILED DESCRIPTION

Figure 1A:
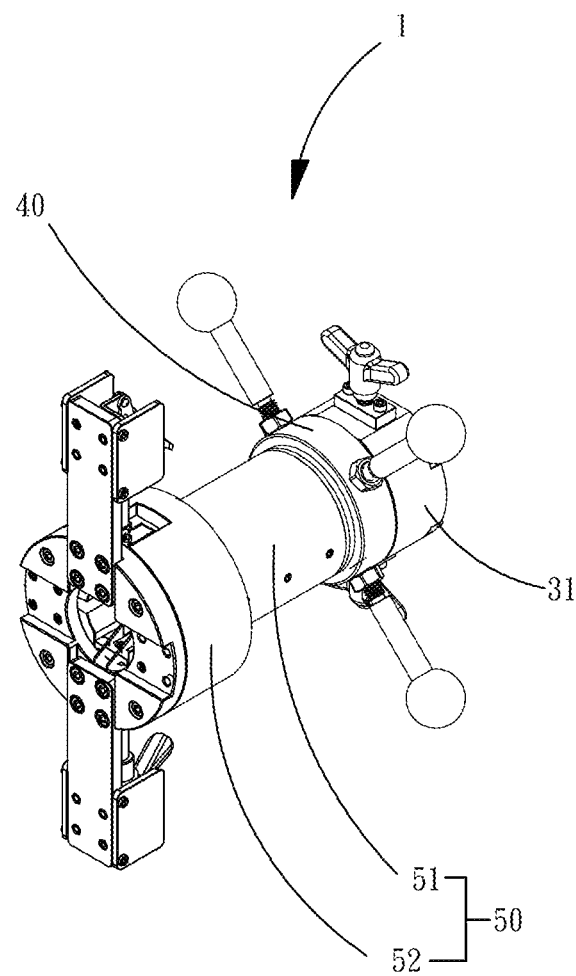
FIG. 1A is a perspective first view of a fibre optic cable stripper, according to an example embodiment.

The following describes various principles related to optical communications by way of reference to specific examples of fibre optic cable termination tools, including arrangements and examples of fibre optic cable strippers embodying innovative concepts. More particularly, but not exclusively, such innovative principles are described in relation to selected examples of fastening means, adjustable settings means, cutting blades, lateral moving means, and tubular enclosures and well-known functions or constructions are be described in detail for purposes of succinctness and clarity. Nonetheless, one or more of the disclosed principles can be incorporated in various other embodiments of fastening means, adjustable settings means, cutting blades, lateral moving means, and tubular enclosures to achieve any of a variety of desired outcomes, characteristics, and/or performance criteria.

Thus, fastening means, adjustable settings means, cutting blades, lateral moving means, and tubular enclosures having attributes that are different from those specific examples discussed herein can embody one or more of the innovative principles, and can be used in applications not described herein in detail. Accordingly, embodiments of fastening means, adjustable settings means, cutting blades, lateral moving means, and tubular enclosures not described herein in detail also fall within the scope of this disclosure, as will be appreciated by those having ordinary skill in the relevant art following a review of this disclosure.

Example embodiments as disclosed herein are directed to fibre optic cable strippers. In an embodiment, fibre optic cable stripper, comprises an alignment and fixing element, a rotational adjuster, and a lateral stripping and removing element. The alignment and fixing element aligns and fixes the fibre optic cable, and comprises an alignment and threaded sleeve portion and a fixing portion. The rotational adjuster is sleeved on the alignment and threaded sleeve portion, and rotatably moves back and forth thereon. The lateral stripping and removing element cuts and strips the fibre optic cable, and comprises an enabling gap portion and a lateral sleeve portion. The lateral sleeve portion is mounted to the rotational adjuster. The enabling gap portion strips at least two gaps through to an end of the fibre optic cable having a preset depth via rotatable movement of the rotational adjuster. The preset depth is different depths defining different diameter sizes of the fibre optic cable.

In some embodiments the fibre optic cable stripper may be applicable to, as an example and not to be limiting, any type of SMF and MFF optical fibre cable provided by any supplier and having different diameter sizes. The optical fibre cable types of the fibre optic cable stripper of the embodiments may be any suitable optical fibre cable type known to those having ordinary skill in the relevant art.

Generally, the fibre optic cable of the embodiments may be used by commercial businesses, governments, data centers, and FTTH and FTTB networks of telecom companies, as an example, and is not limited to any particular type of fibre optic cable.

The attached elements of the fibre optic cable stripper of the embodiments may be separately and/or integrally formed and made of any suitable material known to those having ordinary skill in the relevant art.

Figure 1B:
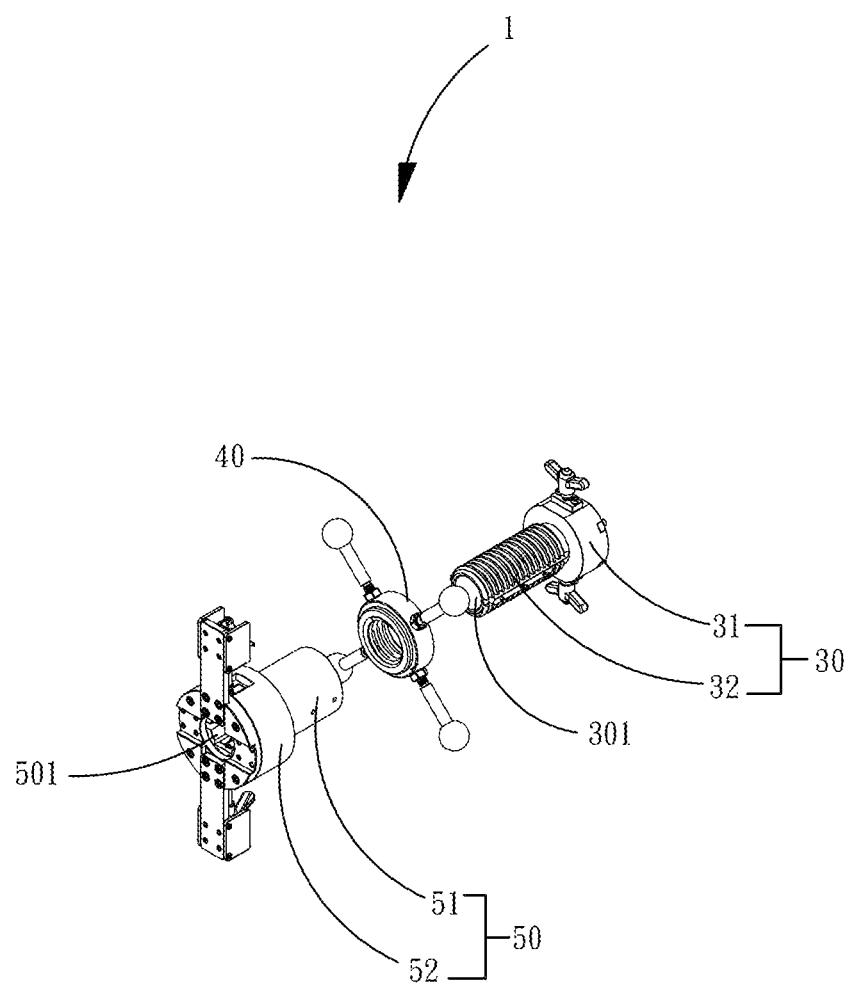
FIG. 1B is a schematic exploded view of the fibre optic cable stripper of FIG. 1, according to an example embodiment.
Figure 1C:
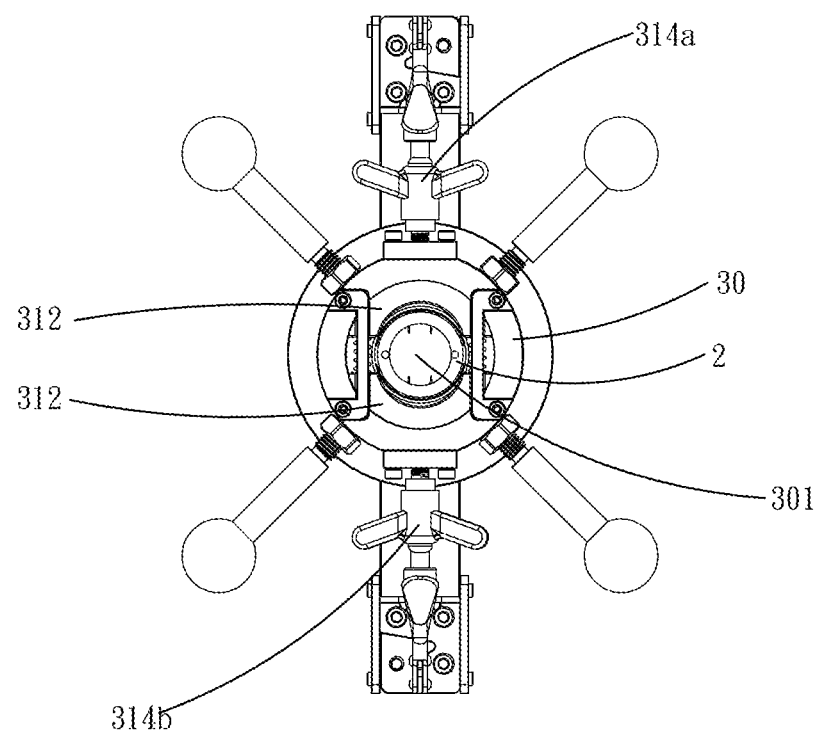
FIG. 1C is a schematic perspective second view of the fibre optic cable stripper of FIG. 1, according to an example embodiment.

FIG. 1A is a perspective first view of a fibre optic cable 2 stripper 1, according to an example embodiment. FIG. 1B is a schematic exploded view of the fibre optic cable 2 stripper 1 of FIG. 1, according to an example embodiment. FIG. 1C is a schematic perspective second view of the fibre optic cable 2 stripper 1 of FIG. 1, according to an example embodiment. Referring to FIGS. 1A to 1C, in an embodiment, a fibre optic cable 2 stripper 1, configured for stripping a fibre optic cable 2, comprising an alignment and fixing element 31, a rotational adjuster 40, and a lateral stripping and removing element 50 is provided. The alignment and fixing element 31 is configured for receiving, aligning and fixing the fibre optic cable 2. The alignment and fixing element 31 comprises an alignment and threaded sleeve portion 32 and a fixing portion 31 attached thereto. The alignment and fixing element 31 define an alignment and fixing core 301 having a distal core central axis. The alignment and threaded sleeve portion 32 comprises a distal threaded end abutting the fixing portion 31, a proximal threaded end opposite the distal threaded end surrounding a proximal alignment and threaded sleeve opening of the alignment and fixing core 301, and a main threaded portion between the proximal and distal threaded ends. The fixing portion 31 is configured to fix and release the fibre optic cable 2 within the fibre optic cable 2 stripper 1. The rotational adjuster 40 is sleeved on the alignment and threaded sleeve portion 32 and configured to rotatably move laterally from the distal to the proximal threaded ends and back. The rotational adjuster 40 has a lateral adjuster central axis. The lateral stripping and removing element 50, configured to cut and strip the fibre optic cable 2, comprises an enabling gap portion 52 and a lateral sleeve portion 51 attached thereto. The lateral sleeve portion 51 is mounted to the rotational adjuster 40, and configured to move from the distal to the proximal threaded ends and back via the rotational adjuster 40. The enabling gap portion 52 strips at least two gaps 20 through to an end of the fibre optic cable 2 having a preset depth via rotatable movement of the rotational adjuster 40. The lateral stripping and removing element 50 define a stripping and removing core 501 having a proximal core central axis.

Those having ordinary skill in the relevant art may readily appreciate, that the rotational direction in which the rotational adjuster 40 is sleeved on the alignment and threaded sleeve portion 32 is not limited to any particular rotational direction; as long as the rotational adjuster 40 may be sleeved on the alignment and threaded sleeve portion 32 and configured to rotatably move laterally from the distal to the proximal threaded ends and back.

The fibre optic cable 2 has a fibre optic cable 2 central axis, and the distal core central axis, lateral adjuster central axis, proximal core central axis, and fibre optic cable 2 central axis are on a same lateral axis. The fibre optic cable 2 is mounted through the alignment and fixing core 301 and stripping and removing core 501 for stripping thereof. Following the receiving and fixing of the fibre optic cable 2, the enabling gap portion 52 strips at least two gaps 20 through to an end of the fibre optic cable 2 having a preset depth via rotatable movement of the rotational adjuster 40 from the distal threaded end toward the proximal threaded end.

Thus, the fibres of the fibre optic cable 2 are enclosed within the alignment and fixing element 31 and lateral stripping and removing element 50 during rotatable movement of the rotational adjuster 40 from the distal threaded end toward the proximal threaded end, and not directly exposed to the outer environment. Accordingly, the possibility for contamination from dust or dirt during termination or splicing processes decreases, increasing the possibility that the joining of fibres therefollowing, will be with minimal signal loss and reflections as well as mechanically stable connections.

In the embodiments, laterally generally refers to a direction parallel to the distal core central axis, lateral adjuster central axis, proximal core central axis, and fibre optic cable 2 central axis.

In some embodiments, the fixing portion 31 comprises a gripping portion 312 and a fixing fastener 314. The gripping portion 312 surrounds a distal alignment and threaded sleeve opening opposite the proximal alignment and threaded sleeve opening and is configured to grip the fibre optic cable 2. The fixing fastener 314 is mounted through the fixing portion 31 to the gripping portion 312 and is configured to move the gripping portion 312 to and from the distal core central axis, fixing and releasing the fibre optic cable 2 from the fibre optic cable 2 stripper 1.

In some embodiments, the fixing fastener 314 comprises a first fixing fastener 314*a* having a first threaded rod and a second fixing fastener 314*b* having a second threaded rod, wherein the second fixing fastener 314*b* is opposite to the first fixing fastener 314*a*. The fixing portion 31 further comprises a first threaded receiving hole receiving the first threaded rod and a second threaded receiving hole receiving the second threaded rod. The gripping portion 312 moves to and from the distal core central axis, fixing and releasing the fibre optic cable 2 from the fibre optic cable 2 stripper 1, via movement of the first and second threaded rods through the first and second threaded receiving holes, respectively. Those having ordinary skill in the relevant art may readily appreciate, that the amount of the fixing fastener 314 of the embodiments may be more than two, and the embodiments are not limited thereto; as long as the gripping portion 312 may move to and from the distal core central axis, fixing and releasing the fibre optic cable 2 from the fibre optic cable 2 stripper 1 via movement of the threaded rods of the fixing fastener 314 through the threaded receiving holes of the fixing portion 31.

In some embodiments, the rotational adjuster 40 comprises at least an adjuster handle 401 and is configured for gripping and rotating the rotational adjuster 40 when rotatably moving the rotational adjuster 40 from the distal to the proximal threaded ends and back. In some embodiments, the rotational adjuster 40 comprises four adjuster handles 401, evenly spaced annularly therearound and configured for gripping and rotating the rotational adjuster 40 when rotatably moving the rotational adjuster 40 from the distal to the proximal threaded ends and back. Those having ordinary skill in the relevant art may readily appreciate, that the amount of the adjuster handles 401 of the embodiments may be more than four, and the embodiments are not limited thereto; as long as the at least an adjuster handle 401 is configured for gripping and rotating the rotational adjuster 40 when rotatably moving the rotational adjuster 40 from the distal to the proximal threaded ends and back.

Figure 2A:
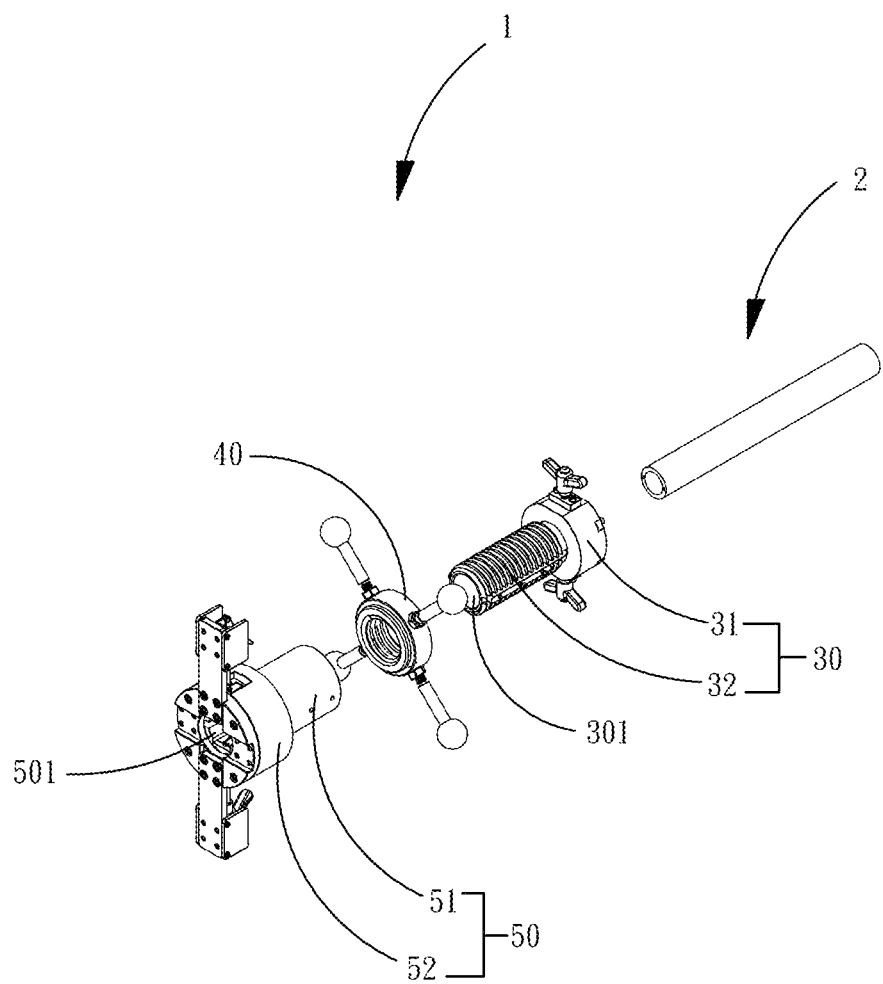
FIG. 2A is a schematic exploded view of the fibre optic cable stripper of FIG. 1, having an outer coating of a fibre optic cable, according to an example embodiment.
Figure 2B:
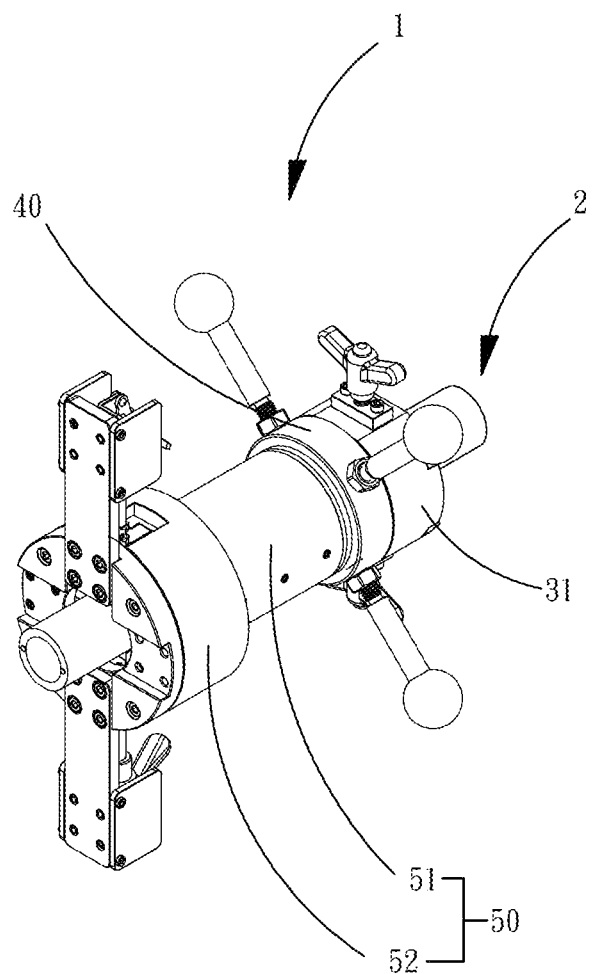
FIG. 2B is a schematic perspective first view of the fibre optic cable stripper of FIG. 2A, having the outer coating of a fibre optic cable mounted therein, according to an example embodiment.
Figure 2C:
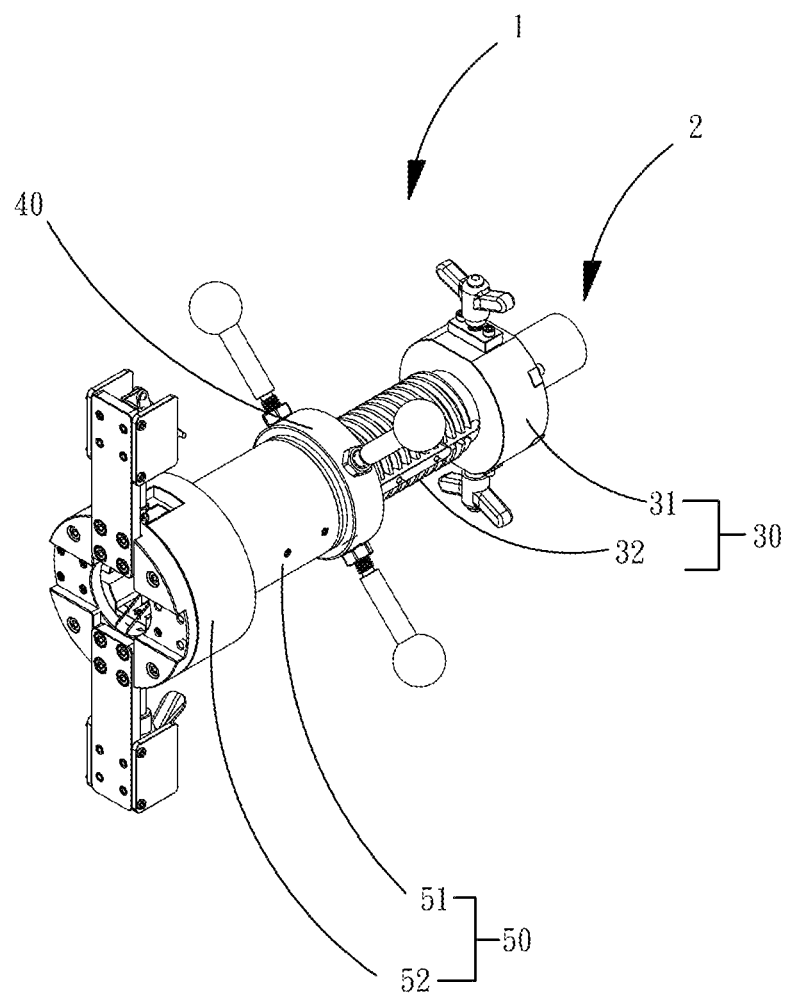
FIG. 2C is a schematic perspective first view of the fibre optic cable stripper of FIG. 2B, in a stripped position, according to an example embodiment.
Figure 2D:
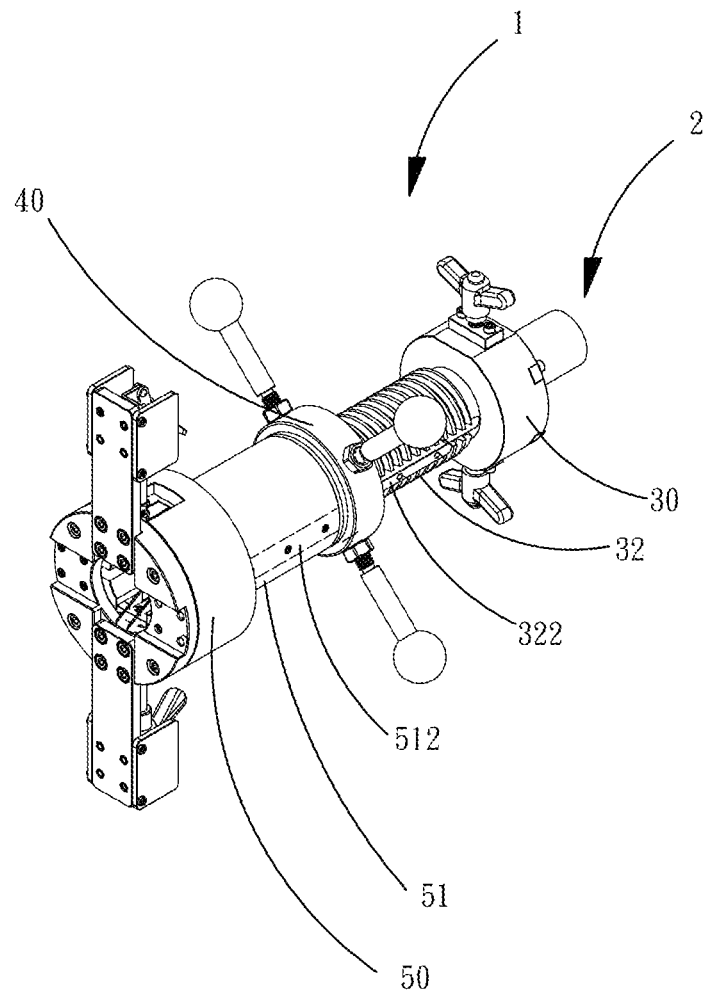
FIG. 2D is a schematic perspective first view of the fibre optic cable stripper of FIG. 2C, illustrating the internal position of a guide trough, according to an example embodiment.

FIG. 2A is a schematic exploded view of the fibre optic cable stripper of FIG. 1, having an outer coating of a fibre optic cable, according to an example embodiment. FIG. 2B is a schematic perspective first view of the fibre optic cable stripper of FIG. 2A, having the outer coating of a fibre optic cable mounted therein, according to an example embodiment. FIG. 2C is a schematic perspective first view of the fibre optic cable stripper of FIG. 2B, in a stripped position according to an example embodiment. FIG. 2D is a schematic perspective first view of the fibre optic cable stripper of FIG. 2C, illustrating the internal position of a guide trough 512, according to an example embodiment. Referring to FIGS. 2A to 2B, and referring to FIGS. 1A to 1C, in some embodiments, the lateral stripping and removing element 50 further comprises a guide trough 512 on an inner side facing the proximal core central axis, and the alignment and threaded sleeve portion 32 comprises a guide rail 322 on an outer side opposite the distal core central axis corresponding to the guide trough 512. When the lateral stripping and removing element 50 moves from the distal to the proximal threaded ends and back via the rotational adjuster 40, the lateral stripping and removing element 50 laterally moves without rotating. Those having ordinary skill in the relevant art may readily appreciate, that the amount of the guide troughs 512 and guide rails 322 of the embodiments may be one, two or more corresponding guide troughs 512 and guide rails 322, and the embodiments are not limited thereto; as long as when the lateral stripping and removing element 50 moves from the distal to the proximal threaded ends and back via the rotational adjuster 40, the lateral stripping and removing element 50 laterally moves without rotating.

Figure 3:
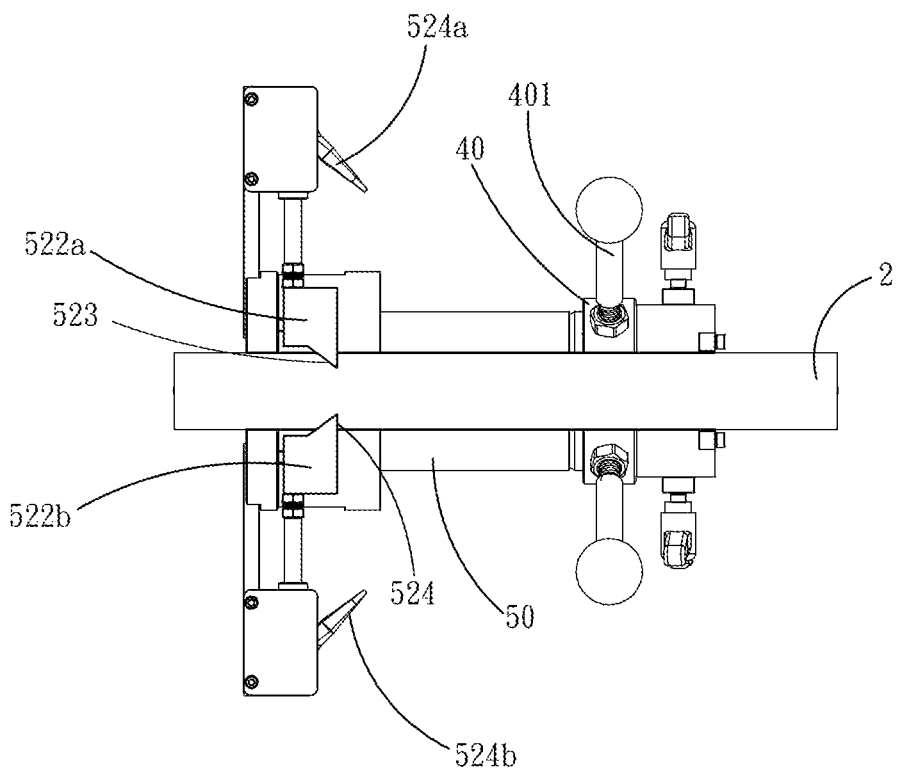
FIG. 3 is a schematic cross-sectional second view of the fibre optic cable stripper of FIG. 2B, according to an example embodiment.
Figure 4:
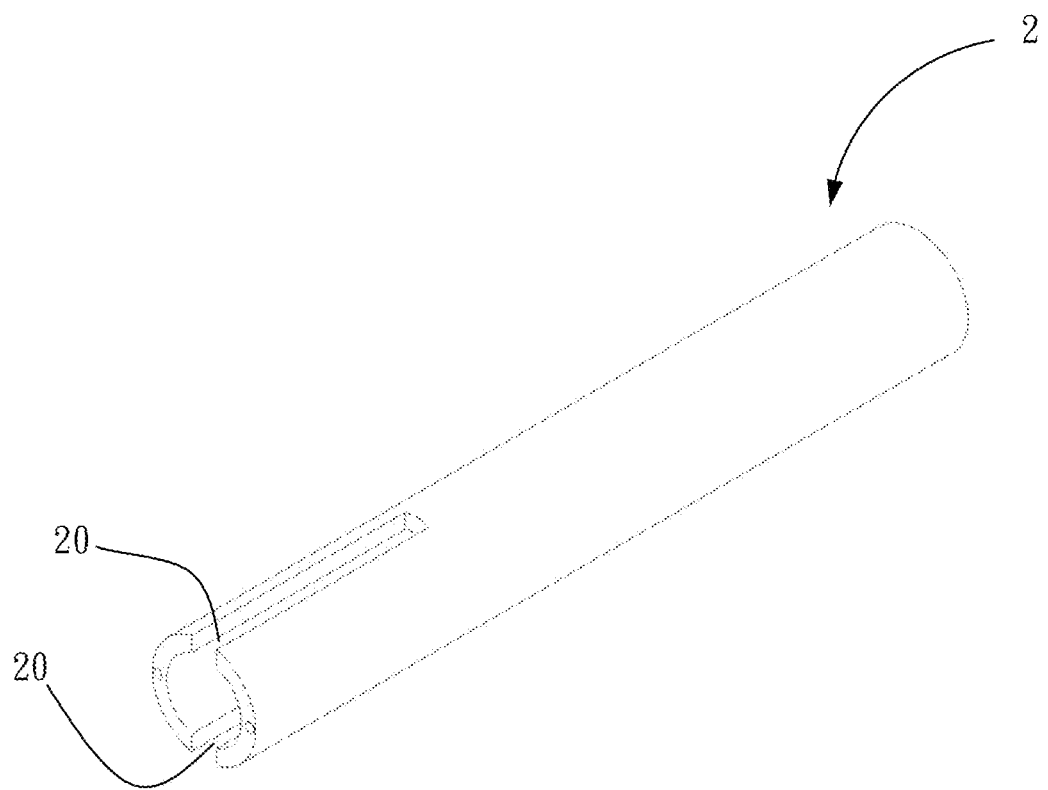
FIG. 4 is a schematic perspective first view of the stripped outer coating of the fibre optic cable of FIG. 2C, according to an example embodiment.

FIG. 3 is a schematic cross-sectional second view of the fibre optic cable stripper of FIG. 2B, according to an example embodiment. FIG. 4 is a schematic perspective first view of the stripped outer coating of the fibre optic cable of FIG. 2C, according to an example embodiment. Referring to FIGS. 3 and 4, and referring to FIGS. 1A to 2D, in some embodiments, the enabling gap portion 52 comprises a first enabling gap blade 522a and a second enabling gap blade 522b and a first enabling gap control setting lever 524a and a second enabling gap control setting lever 524b. The first and second enabling gap blades 522a, 522b are protrudable through the stripping and removing core 501, and configured to cut and strip the fibre optic cable 2 having a preset depth. The first and second enabling gap control setting lever 524a, 524b are mounted through the enabling gap portion 52 to the first and second enabling gap blades 522a, 522b, respectively, and configured to move the first and second enabling gap blades 522a, 522b to the preset depth toward the proximal core central axis and back, and cut and strip the fibre optic cable 2, forming the at least two gaps 20 via the rotational adjuster 40 moving the lateral stripping and removing element 50 mounted thereto from the distal to the proximal threaded end. The first and second enabling gap blades 522a, 522b and first and second enabling gap control setting lever 524a, 524b are disposed on opposing ends of the enabling gap portion 52. In some embodiments, each of the first and second enabling gap blades 522a, 522b comprises a proximal edge 524 and an angled edge 523. The proximal edge 524 is perpendicular with the proximal core central axis and configured to precisely cut vertically straight into the fibre optic cable 2 having the preset depth. The angled edge 523 is opposite the proximal edge 524, and angled toward a proximal lateral stripping and removing element opening of the lateral stripping and removing element 50. The angled edge 523 is configured to precisely cut laterally straight through the fibre optic cable 2 having the preset depth and laterally strip the fibre optic cable 2 to form the at least two gaps 20 via the rotational adjuster 40 moving the lateral stripping and removing element 50 mounted thereto from the distal to the proximal threaded end. Those having ordinary skill in the relevant art may readily appreciate, that the amount of the enabling gap blades 522a, 522b and enabling gap control setting levers 524a, 524b of the embodiments may be more than two, and the embodiments are not limited thereto; as long as the enabling gap blades 522a, 522b are protrudable through the stripping and removing core 501, and may be configured to cut and strip a fibre optic cable 2 having a preset depth.

In some embodiments, the enabling gap portion 52 further comprises a third enabling gap blade 522c and a fourth enabling gap blade 522d and a third enabling gap control setting lever 524c and a fourth enabling gap control setting lever 524d. The third and fourth enabling gap blades 522c, 522d, protrudable through the stripping and removing core 501, are configured to cut and strip the fibre optic cable 2 having a preset depth. The third and fourth enabling gap control setting levers 524c, 524d mounted through the enabling gap portion 52 to the third and fourth enabling gap blades 522c, 522d, respectively, are configured to move the third and fourth enabling gap blades 522c, 522d to the preset depth toward the proximal core central axis and back, and cut and strip the fibre optic cable 2, forming four gaps via the rotational adjuster 40 moving the lateral stripping and removing element 50 mounted thereto from the distal to the proximal threaded end. The first, second, third and fourth enabling gap blades 522a, 522b, 522c, 522d and first, second, third and fourth enabling gap control setting levers 524a, 524b, 524c, 524d are evenly spaced annularly around the enabling gap portion 52. In some embodiments, each of the first, second, third, and fourth enabling gap blades 522a, 522b, 522c, 522d comprise a proximal edge 524 and an angled edge 523. The proximal edge 524 is perpendicular with the proximal core central axis and configured to precisely cut vertically straight into the fibre optic cable 2 having the preset depth. The angled edge 523 is opposite the proximal edge 524 and angled toward a proximal lateral stripping and removing element opening of the lateral stripping and removing element 50. The angled edge 523 is configured to precisely cut vertically straight through the fibre optic cable 2 having the preset depth and laterally strip the fibre optic cable 2 to form the at least two gaps 20 via the rotational adjuster 40 moving the lateral stripping and removing element 50 mounted thereto from the distal to the proximal threaded end.

Thus, a compression force by a squeezing motion from a user's hand is not required to cut and strip the fibre optic cable 2. The fibre optic cable 2 is precisely cut laterally straight therethrough to a preset depth, not by a hand of a user performing a squeezing motion, but, mechanically, via the adjustable enabling gap control setting lever 524, setting a depth of the enabling gap blade 522. Furthermore, the fibre optic cable 2 is stripped to the proximal lateral stripping and removing element opening, not by a hand of a user performing a pulling or peeling motion, but, mechanically, via the lateral sleeve portion 51 being attached to the enabling gap portion 52 on one end and mounted to the rotational adjuster 40 on the other opposing end, whereby rotational movement of the rotational adjuster 40, laterally moves the enabling gap portion 52 to the proximal lateral stripping and removing element opening without rotating. Accordingly, as direct manual manipulation by operators is replaced with the mechanical elements of the fibre optic cable 2 stripper 1 of the embodiments being set prior to operation, the possibility of fibres being nicked, scratched, cracked or broken during, as an example, the optical fibre cable jacket and/or buffer removal and/or optical fibre stripping, is decreased, thus, increasing the possibility for mechanically stable connections and joining of fibres with minimal signal loss and reflections, following the stripping of the fibre optic cable 2.

In some embodiments, the preset depth is different depths defining different diameter sizes of the fibre optic cable 2 centered on the fibre optic cable 2 axis.

Thus, a separate dedicated notch for each preset factory determined diameter size, as an example, a different diameter size for an optical fibre jacket, buffer, and coating, respectively, is not required of the fibre optic cable 2 stripper 1 of the embodiments. The adjustable enabling gap control setting lever 524 sets the preset depth of the enabling gap blade 522. Having multiple separate notches is not required, and for handheld mechanical optical fibre strippers that offer interchangeable different sized blades, additional parts and manual blade adjustments are not required. Accordingly, the size, portability, convenience, additional blade size parts, and additional operational time for manual adjustments of the fibre optic cable 2 of the embodiments is not influenced and exacerbated as the amount of different suppliers and types of SMF and MFF optical fibre cables requiring different diameter sizes, increases.

In an embodiment of a fibre optic cable system for providing a preset depth of a fibre optic cable via a fibre optic cable stripper 1, the system further comprises a fibre optic cable 2. The fibre optic cable stripper 1 in the system is as described in detail in the embodiments, and for sake of brevity, will not repeated hereafter.

With new data centers being built and existing data centers being upgraded, along with technological advancements in the telecom sector increasing the deployment of broadband network architectures such as Fibre to the Home (FTTH) and Fibre to the Building (FTTB), technicians are increasingly being required to terminate fibre optic cables not just when deployed, but, several times during deployment. One of the first steps in fibre optic cable termination is the stripping of the fibre optic cable. Generally, stripping mechanical tools cost less, require less power, and are smaller and more portable than special stripping and preparation instruments or machines.

Stripping mechanical tools, such as, handheld mechanical optical fibre strippers, generally, cut into a protective coating of an optical fibre cable with at least a cut blade via a compression force by a squeezing motion from a technician's hand to a preset factory determined depth, such as, via a specific hole diameter, for removal or pulling of the protective coating. As the amount of preset factory determined diameter sizes increase, as an example, different diameter sizes for an optical fibre jacket, buffer, and coating, the amount of separate notches required increases, increasing size and decreasing portability and convenience of the handheld mechanical optical fibre strippers. For handheld mechanical optical fibre strippers that offer interchangeable different sized blades, additional parts and manual blade adjustments are required by technicians, decreasing convenience due to lost parts and increasing operational time for manual adjustments. For both types of handheld mechanical tools, the conditions are exacerbated as the amount of different suppliers and types of SMF and MFF optical fibre cables requiring different diameter sizes, increases. Both types of handheld mechanical tools typically require the technician to manually cut and pull the protective coating from the optical fibre, increasing manual manipulation by technicians, while in-turn increasing the possibility of fibres being nicked, scratched, cracked or broken during, as an example, the optical fibre cable jacket and/or buffer removal and/or optical fibre stripping. Thus, decreasing the possibility for mechanically stable connections and joining of fibres with minimal signal loss and reflections. Furthermore, both types of handheld mechanical tools require a coating or layer of the optical fibre cable to be directly exposed to the outer environment after manual pulling of the cut coating, increasing the possibility for contamination from dust or dirt. Contamination from dust or dirt during the termination or splicing process also decreases the possibility that the joining of fibres would be with minimal signal loss and reflections as well as mechanically stable connections.

In the embodiments, a fibre optic cable stripper, comprising an alignment and fixing element, a rotational adjuster, and a lateral stripping and removing element is provided. The alignment and fixing element, aligning and fixing the fibre optic cable, comprises an alignment and threaded sleeve portion and a fixing portion. The rotational adjuster, sleeved on the alignment and threaded sleeve portion, rotatably moves back and forth thereon. The lateral stripping and removing element, cutting and stripping and rotating the rotational adjuster, comprises an enabling gap portion and a lateral sleeve portion. The lateral sleeve portion is mounted to the rotational adjuster and the enabling gap portion strips at least two gaps through to an end of the fibre optic cable having a preset depth via rotatable movement of the rotational adjuster. The preset depth is different depths defining different diameter sizes of the fibre optic cable.

The embodiments of the fibre optic cable stripper 1 allow for fibres of the fibre optic cable 2 to be enclosed within the alignment and fixing element 31 and lateral stripping and removing element 50 during rotatable movement of the rotational adjuster 40 from the distal threaded end toward the proximal threaded end, and not directly exposed to the outer environment. Accordingly, the possibility for contamination from dust or dirt during termination or splicing processes decreases, increasing the possibility that the joining of fibres therefollowing, will be with minimal signal loss and reflections as well as mechanically stable connections.

The embodiments of the fibre optic cable stripper 1 also allow for compression forces by a squeezing motion from a user's hand to not be required to cut and strip the fibre optic cable 2. The fibre optic cable 2 is precisely cut laterally straight therethrough to a preset depth, not by a hand of a user performing a squeezing motion, but, mechanically, via the adjustable enabling gap control setting lever 524, setting a depth of the enabling gap blade 522. Furthermore, the embodiments of the fibre optic cable stripper 1 also allow for the fibre optic cable 2 to be stripped to the proximal lateral stripping and removing element opening, not by a hand of a user performing a pulling or peeling motion, but, mechanically, via the lateral sleeve portion 51 being attached to the enabling gap portion 52 on one end and mounted to the rotational adjuster 40 on the other opposing end, whereby rotational movement of the rotational adjuster 40, laterally moves the enabling gap portion 52 to the proximal lateral stripping and removing element opening without rotating. Accordingly, as direct manual manipulation by operators is replaced with the mechanical elements of the fibre optic cable 2 stripper 1 of the embodiments being set prior to operation, the possibility of fibres being nicked, scratched, cracked or broken during, as an example, the optical fibre cable jacket and/or buffer removal and/or optical fibre stripping, is decreased, thus, increasing the possibility for mechanically stable connections and joining of fibres with minimal signal loss and reflections, following the stripping of the fibre optic cable 2.

The embodiments of the fibre optic cable stripper 1 furthermore allow for a separate dedicated notch for each preset factory determined diameter size, as an example, a different diameter size for an optical fibre jacket, buffer, and coating, respectively, to not be required of the fibre optic cable 2 stripper 1 of the embodiments. The adjustable enabling gap control setting lever 524 sets the preset depth of the enabling gap blade 522. Having multiple separate notches is not required, and for handheld mechanical optical fibre strippers that offer interchangeable different sized blades, additional parts and manual blade adjustments are not required. Accordingly, the size, portability, convenience, additional blade size parts, and additional operational time for manual adjustments of the fibre optic cable 2 of the embodiments is not influenced and exacerbated as the amount of different suppliers and types of SMF and MFF optical fibre cables requiring different diameter sizes, increases.

The presently disclosed inventive concepts are not intended to be limited to the embodiments shown herein, but are to be accorded their full scope consistent with the principles underlying the disclosed concepts herein. Directions and references to an element, such as "up," "down,", "upper," "lower," "horizontal," "vertical," "left," "right," and the like, do not imply absolute relationships, positions, and/or orientations. Terms of an element, such as "first" and "second" are not literal, but, distinguishing terms. As used herein, terms "comprises" or "comprising" encompass the notions of "including" and "having" and specify the presence of elements, operations, and/or groups or combinations thereof and do not imply preclusion of the presence or addition of one or more other elements, operations and/or groups or combinations thereof. Sequence of operations do not imply absoluteness unless specifically so stated. Reference to an element in the singular, such as by use of the article "a" or "an", is not intended to mean "one and only one" unless specifically so stated, but rather "one or more". As used herein, "and/or" means "and" or "or", as well as "and" and "or." As used herein, ranges and subranges mean all ranges including whole and/or fractional values therein and language which defines or modifies ranges and subranges, such as "at least," "greater than," "less than," "no more than," and the like, mean subranges and/or an upper or lower limit. All structural and functional equivalents to the elements of the various embodiments described throughout the disclosure that are known or later come to be known to those having ordinary skill in the relevant art are intended to be encompassed by the features described and claimed herein. Moreover, nothing disclosed herein is intended to be dedicated to the public regardless of whether such disclosure may ultimately explicitly be recited in the claims. No element or concept disclosed herein or hereafter presented shall be construed under the provisions of 35 USC 112(f) unless the element or concept is expressly recited using the phrase "means for" or "step for".

In view of the many possible embodiments to which the disclosed principles can be applied, we reserve the right to claim any and all combinations of features and acts described herein, including the right to claim all that comes within the scope and spirit of the foregoing description, as well as the combinations recited, literally and equivalently, in the following claims and any claims presented anytime throughout prosecution of this application or any application claiming benefit of or priority from this application.

What is claimed is:

1. A fibre optic cable stripper, configured for stripping a fibre optic cable, comprising:
   an alignment and fixing element configured for receiving, aligning and fixing the fibre optic cable, having an alignment and threaded sleeve portion and a fixing portion attached thereto, the alignment and fixing element define an alignment and fixing core having a distal core central axis, the fixing portion is configured to fix the fibre optic cable within the fibre optic cable stripper;
   a rotational adjuster having a lateral adjuster central axis, sleeved on the alignment and threaded sleeve portion, configured to rotatably move laterally back and forth; and
   a lateral stripping and removing element, comprising an enabling gap portion and a lateral sleeve portion attached thereto, the lateral sleeve portion mounted to the rotational adjuster, the lateral stripping and removing element configured to move back and forth via the rotational adjuster, the lateral stripping and removing element define a stripping and removing core having a proximal core central axis,
   wherein the fibre optic cable is mounted through the alignment and fixing core and stripping and removing core for stripping thereof, whereby following the receiving and fixing of the fibre optic cable, the enabling gap portion strips at least two gaps through to an end of the fibre optic cable having a preset depth via rotatable movement of the rotational adjuster.

2. The fibre optic cable stripper of claim 1, wherein the alignment and threaded sleeve portion comprises a distal threaded end abutting the fixing portion, a proximal threaded end opposite the distal threaded end surrounding a proximal alignment and threaded sleeve opening of the alignment and fixing core, and a main threaded portion between the proximal and distal threaded ends, whereby the rotational adjuster is configured to rotatably move laterally back and forth from the distal to the proximal threaded ends, whereby the lateral stripping and removing element is configured to move back and forth from the distal to the proximal threaded ends and back via the rotational adjuster, and whereby the enabling gap portion strips at least two gaps through to an end of the fibre optic cable having a preset depth via rotatable movement of the rotational adjuster from the distal threaded end toward the proximal threaded end.

3. The fibre optic cable stripper of claim 2, wherein the fixing portion comprises a gripping portion and a fixing fastener, the gripping portion surrounding a distal alignment and threaded sleeve opening opposite the proximal alignment and threaded sleeve opening, configured to grip the fibre optic cable, the fixing fastener mounted through the fixing portion to the gripping portion, configured to move the gripping portion to and from the distal core central axis, fixing and releasing the fibre optic cable from the fibre optic cable stripper.

4. The fibre optic cable stripper of claim 3, wherein the fixing fastener comprises a first fixing fastener having a first threaded rod and a second fixing fastener having a second threaded rod, the second fixing fastener opposite to the first fixing fastener, the fixing portion further comprises a first threaded receiving hole receiving the first threaded rod and a second threaded receiving hole receiving the second threaded rod, whereby the gripping portion moves to and from the distal core central axis, fixing and releasing the fibre optic cable from the fibre optic cable stripper, via movement of the first and second threaded rods through the first and second threaded receiving holes, respectively.

5. The fibre optic cable stripper of claim 2, wherein the rotational adjuster comprises at least an adjuster handle, configured for gripping and rotating the rotational adjuster when rotatably moving the rotational adjuster from the distal to the proximal threaded ends and back.

6. The fibre optic cable stripper of claim 2, wherein the rotational adjuster comprises four adjuster handles, evenly spaced annularly therearound, configured for gripping and rotating the rotational adjuster when rotatably moving the rotational adjuster from the distal to the proximal threaded ends and back.

7. The fibre optic cable stripper of claim 2, wherein the lateral stripping and removing element further comprises a guide trough on an inner side facing the proximal core central axis, and the alignment and threaded sleeve portion comprises a guide rail on an outer side opposite the distal core central axis corresponding to the guide trough, whereby when the lateral stripping and removing element moves from the distal to the proximal threaded ends and back via the rotational adjuster, the lateral stripping and removing element laterally moves without rotating.

8. The fibre optic cable stripper of claim 1, wherein the enabling gap portion comprises a first enabling gap blade and a second enabling gap blade and a first enabling gap control setting lever and a second enabling gap control setting lever, the first and second enabling gap blades, protrudable through the stripping and removing core, are configured to cut and strip the fibre optic cable having a preset depth, the first and second enabling gap control setting levers are mounted through the enabling gap portion to the first and second enabling gap blades, respectively, and configured to move the first and second enabling gap blades to the preset depth toward the proximal core central axis and back, and cut and strip the fibre optic cable, forming the at least two gaps via the rotational adjuster moving the lateral stripping and removing element mounted thereto from the distal to the proximal threaded end, wherein the first and second enabling gap blades and first and second enabling gap control setting levers are disposed on opposing ends of the enabling gap portion.

9. The fibre optic cable stripper of claim 8, wherein the enabling gap portion further comprises a third enabling gap blade and a fourth enabling gap blade and a third enabling gap control setting lever and a fourth enabling gap control setting lever, the third and fourth enabling gap blades, protrudable through the stripping and removing core, are configured to cut and strip the fibre optic cable having a preset depth, the third and fourth enabling gap control setting levers mounted through the enabling gap portion to the third and fourth enabling gap blades, respectively, are configured to move the third and fourth enabling gap blades to the preset depth toward the proximal core central axis and back, and cut and strip the fibre optic cable, forming four gaps via the rotational adjuster moving the lateral stripping and removing element mounted thereto from the distal to the proximal threaded end, wherein the first, second, third and fourth enabling gap blades and first, second, third and fourth enabling gap control setting levers are evenly spaced annularly around the enabling gap portion.

10. The fibre optic cable stripper of claim 9, wherein each of the first, second, third, and fourth enabling gap blades comprise a proximal edge, perpendicular with the proximal core central axis, configured to cut vertically straight into the fibre optic cable having the preset depth, and an angled edge, opposite the proximal edge, angled toward a proximal lateral stripping and removing element opening of the lateral stripping and removing element, configured to cut vertically straight through the fibre optic cable having the preset depth and laterally strip the fibre optic cable to form the at least two gaps via the rotational adjuster moving the lateral stripping and removing element mounted thereto from the distal to the proximal threaded end.

11. The fibre optic cable stripper of claim 8, wherein each of the first and second enabling gap blades comprise a proximal edge, perpendicular with the proximal core central axis, configured to cut vertically straight into the fibre optic cable having the preset depth, and an angled edge, opposite the proximal edge, angled toward a proximal lateral stripping and removing element opening of the lateral stripping and removing element, configured to cut vertically straight through the fibre optic cable having the preset depth and laterally strip the fibre optic cable to form the at least two gaps via the rotational adjuster moving the lateral stripping and removing element mounted thereto from the distal to the proximal threaded end.

12. The fibre optic cable stripper of claim 1, wherein the preset depth is different depths defining different diameter sizes of the fibre optic cable centered on the fibre optic cable axis.

13. The fibre optic cable stripper of claim 1, wherein the fibre optic cable has a fibre optic cable central axis, and the distal core central axis, lateral adjuster central axis, proximal core central axis, and fibre optic cable central axis are on a same lateral axis.

14. A fibre optic cable system, comprising:
a fibre optical cable; and
a fibre optic cable stripper, configured for stripping a fibre optic cable, comprising:
an alignment and fixing element configured for receiving, aligning and fixing the fibre optic cable, having an alignment and threaded sleeve portion and a fixing portion attached thereto, the alignment and fixing element define an alignment and fixing core having a distal core central axis, the fixing portion is configured to fix the fibre optic cable within the fibre optic cable stripper;
a rotational adjuster having a lateral adjuster central axis, sleeved on the alignment and threaded sleeve portion, configured to rotatably move laterally back and forth; and
a lateral stripping and removing element, comprising an enabling gap portion and a lateral sleeve portion attached thereto, the lateral sleeve portion mounted to the rotational adjuster, the lateral stripping and removing element configured to move back and forth via the rotational adjuster, the lateral stripping and removing element define a stripping and removing core having a proximal core central axis,
wherein the fibre optic cable is mounted through the alignment and fixing core and stripping and removing core for stripping thereof, whereby following the receiving and fixing of the fibre optic cable, the enabling gap portion strips at least two gaps through to an end of the fibre optic cable having a preset depth via rotatable movement of the rotational adjuster.

15. A fibre optic cable system of claim 14, wherein the alignment and threaded sleeve portion comprises a distal threaded end abutting the fixing portion, a proximal threaded end opposite the distal threaded end surrounding a proximal alignment and threaded sleeve opening of the alignment and fixing core, and a main threaded portion between the proximal and distal threaded ends, whereby the rotational adjuster is configured to rotatably move laterally back and forth from the distal to the proximal threaded ends, whereby the lateral stripping and removing element is configured to move back and forth from the distal to the proximal threaded ends and back via the rotational adjuster, and whereby the enabling gap portion strips at least two gaps through to an end of the fibre optic cable having a preset depth via rotatable movement of the rotational adjuster from the distal threaded end toward the proximal threaded end.

16. The fibre optic cable system of claim 15, wherein the fixing portion comprises a gripping portion and a fixing fastener, the gripping portion surrounding a distal alignment and threaded sleeve opening opposite the proximal alignment and threaded sleeve opening, configured to grip the fibre optic cable, the fixing fastener mounted through the fixing portion to the gripping portion, configured to move the gripping portion to and from the distal core central axis, fixing and releasing the fibre optic cable from the fibre optic cable stripper.

17. The fibre optic cable system of claim 16, wherein the fixing fastener comprises a first fixing fastener having a first threaded rod and a second fixing fastener having a second threaded rod, the second fixing fastener opposite to the first fixing fastener, the fixing portion further comprises a first threaded receiving hole receiving the first threaded rod and a second threaded receiving hole receiving the second threaded rod, whereby the gripping portion moves to and from the distal core central axis, fixing and releasing the fibre optic cable from the fibre optic cable stripper, via movement of the first and second threaded rods through the first and second threaded receiving holes, respectively.

18. The fibre optic cable system of claim 15, wherein the rotational adjuster comprises at least an adjuster handle, configured for gripping and rotating the rotational adjuster when rotatably moving the rotational adjuster from the distal to the proximal threaded ends and back.

19. The fibre optic cable system of claim 15, wherein the rotational adjuster comprises four adjuster handles, evenly spaced annularly therearound, configured for gripping and rotating the rotational adjuster when rotatably moving the rotational adjuster from the distal to the proximal threaded ends and back.

20. The fibre optic cable system of claim 15, wherein the lateral stripping and removing element further comprises a guide trough on an inner side facing the proximal core central axis, and the alignment and threaded sleeve portion comprises a guide rail on an outer side opposite the distal core central axis corresponding to the guide trough, whereby when the lateral stripping and removing element moves from the distal to the proximal threaded ends and back via the rotational adjuster, the lateral stripping and removing element laterally moves without rotating.

* * * * *